(12) United States Patent
Tsuchida

(10) Patent No.: US 7,768,774 B2
(45) Date of Patent: Aug. 3, 2010

(54) HARD DISK DRIVE AND DISPLAY UNIT

(75) Inventor: Shunichi Tsuchida, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 337 days.

(21) Appl. No.: 12/034,525

(22) Filed: Feb. 20, 2008

(65) Prior Publication Data

US 2008/0252183 A1 Oct. 16, 2008

(30) Foreign Application Priority Data

Apr. 10, 2007 (JP) .............................. 2007-103156

(51) Int. Cl.
G06F 1/16 (2006.01)
(52) U.S. Cl. ................ 361/679.21; 312/7.2; 361/679.33
(58) Field of Classification Search ............ 361/679.21, 361/679.33
See application file for complete search history.

(56) References Cited

U.S. PATENT DOCUMENTS 5,831,816 A * 11/1998 Johns et al. ............ 361/679.21

6,188,569 B1 * 2/2001 Minemoto et al. ...... 361/679.33
2003/0231463 A1 * 12/2003 Hood et al. .................. 361/685

FOREIGN PATENT DOCUMENTS

| JP | 2002-304877 | 10/2002 |
|---|---|---|
| JP | 3091986 | 11/2002 |
| JP | 2003-242764 | 8/2003 |
| JP | 2006-107631 | 4/2006 |
| JP | 2006-161985 | 6/2006 |

* cited by examiner

*Primary Examiner*—Lisa Lea-Edmonds
(74) *Attorney, Agent, or Firm*—Blakely, Sokoloff, Taylor & Zafman LLP

(57) ABSTRACT

According to one embodiment, a hard disk drive comprises a housing, a drive main unit contained in the housing, a frame which supports the drive main unit to keep the drive main unit away from the housing, a projection contained in the housing and inwardly projecting, the frame being mounted on the projection, and a bush provided between the frame and the projection. The bush radially receives the weight of the drive main unit. The frame includes a frame main body, a holding portion incorporated in the frame main body and supporting the bush, and a contact portion provided independently of the holding portion and radially contacting the bush.

5 Claims, 6 Drawing Sheets

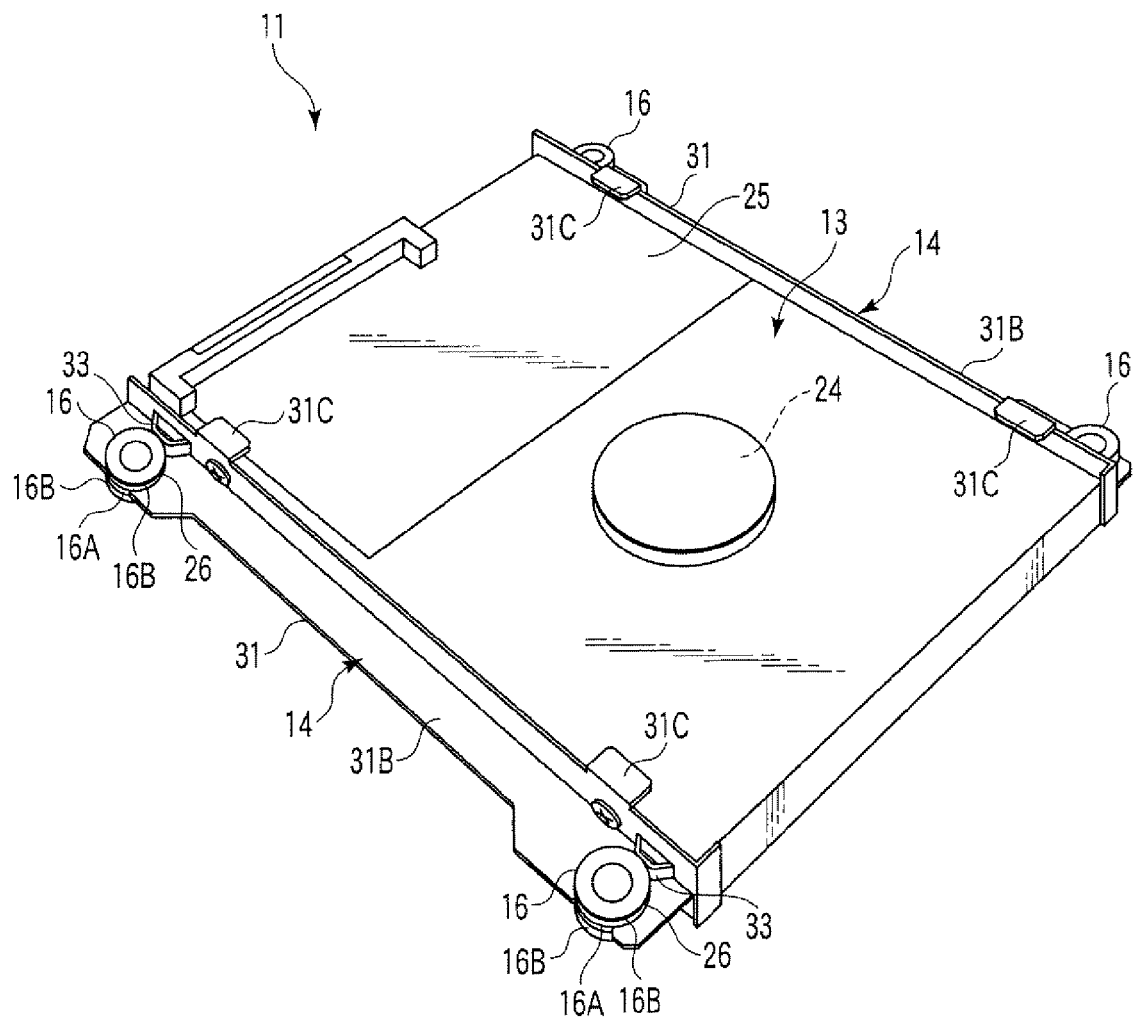
F I G. 3

HARD DISK DRIVE AND DISPLAY UNIT

CROSS-REFERENCE TO RELATED APPLICATIONS

This application is based upon and claims the benefit of priority from Japanese Patent Application No. 2007-103156, filed Apr. 10, 2007, the entire contents of which are incorporated herein by reference.

BACKGROUND

1. Field

One embodiment of the invention relates to a hard disk drive with anti-vibration bushes, and a display unit.

2. Description of the Related Art

Jpn. Pat Appln, KOKAI Publication No. 2006-107631, for example, discloses a hard disk drive. This drive is of a so-called laterally mounted type, and comprises a case, a main unit contained in the case, four projections corresponding to the corners of the main unit, fittings attached to the projections and supporting the main unit, and bushes and spacers interposed between the fittings and projections. The bushes and spacers are elastic, and the bushes are cylindrical.

When an external impact is imparted to the hard disk driver the bushes and spacers absorb it. As a result, the main unit is protected from the external impact. At this time, the impact is imparted axially to the bushes, therefore the bushes will not be broken.

The above hard disk drive may well be used standing on end. In this state, the whole weight of the main unit is applied radially to the bushes. Thus, great load is always applied to the bushes. Therefore, if an external impact is imparted to the hard disk drive in addition to the load, the fittings may bite into and cut the bushes.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is an exemplary perspective view illustrating the main unit and frame of the hard disk drive of FIG. 2, taken when they are viewed from below;

DETAILED DESCRIPTION

Various embodiments according to the invention will be described hereinafter with reference to the accompanying drawings. In general, according to one embodiment of the invention. A hard disk drive comprises a housing, a drive main unit contained in the housing, a frame which supports the drive main unit to keep the drive main unit away from the housing, a projection contained in the housing and inwardly projecting, the frame being mounted on the projection, and a bush provided between the frame and the projection. The bush radially receives the weight of the drive main unit. The frame includes a frame main body, a holding portion incorporated in the frame main body and supporting the bush, and a contact portion provided independently of the holding portion and radially contacting the bush.

A hard disk drive according to a first embodiment of the invention will be described with reference to FIGS. 1 to 7. This hard disk drive is used, mounted in a display unit such as a television set, and is used, standing on end, in view of thinning of the display unit.

Figures 6, 7:
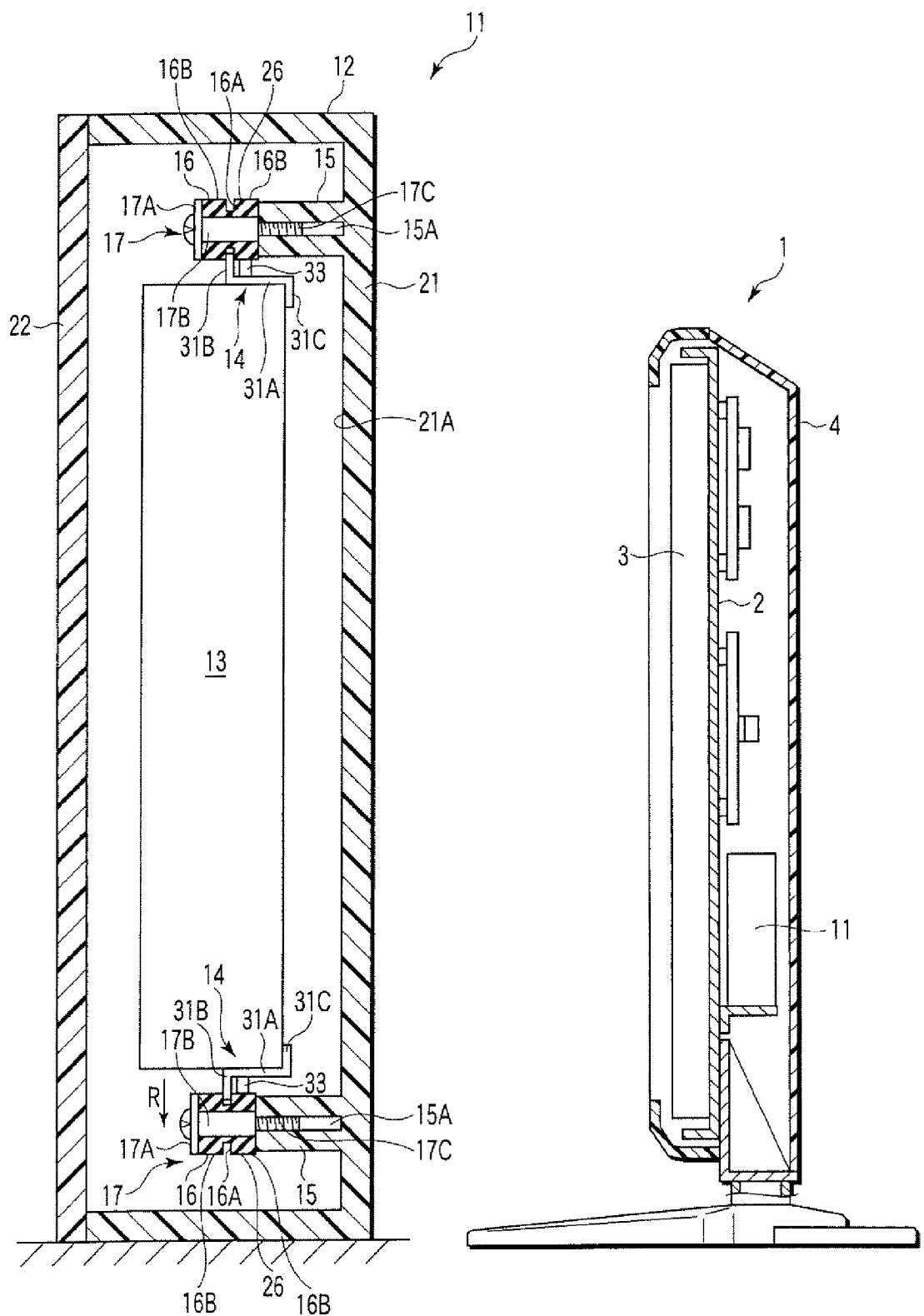
FIG. 6 is an exemplary sectional view taken along line F6-F6 of FIG. 1, when the hard disk drive of FIG. 1 is stood vertically.
FIG. 7 is an exemplary sectional view illustrating a television set as an example of a display unit.

As shown in FIG. 7, a television set 1 as an example of a display unit comprises a frame member 2, a display 3 attached to the frame member 2, a hard disk drive 11 attached to the frame member 2, standing on end, and a casing 4 surrounding these members. The hard disk drive 11 is mounted parallel to the display 3, i.e., vertically mounted.

Figure 1:
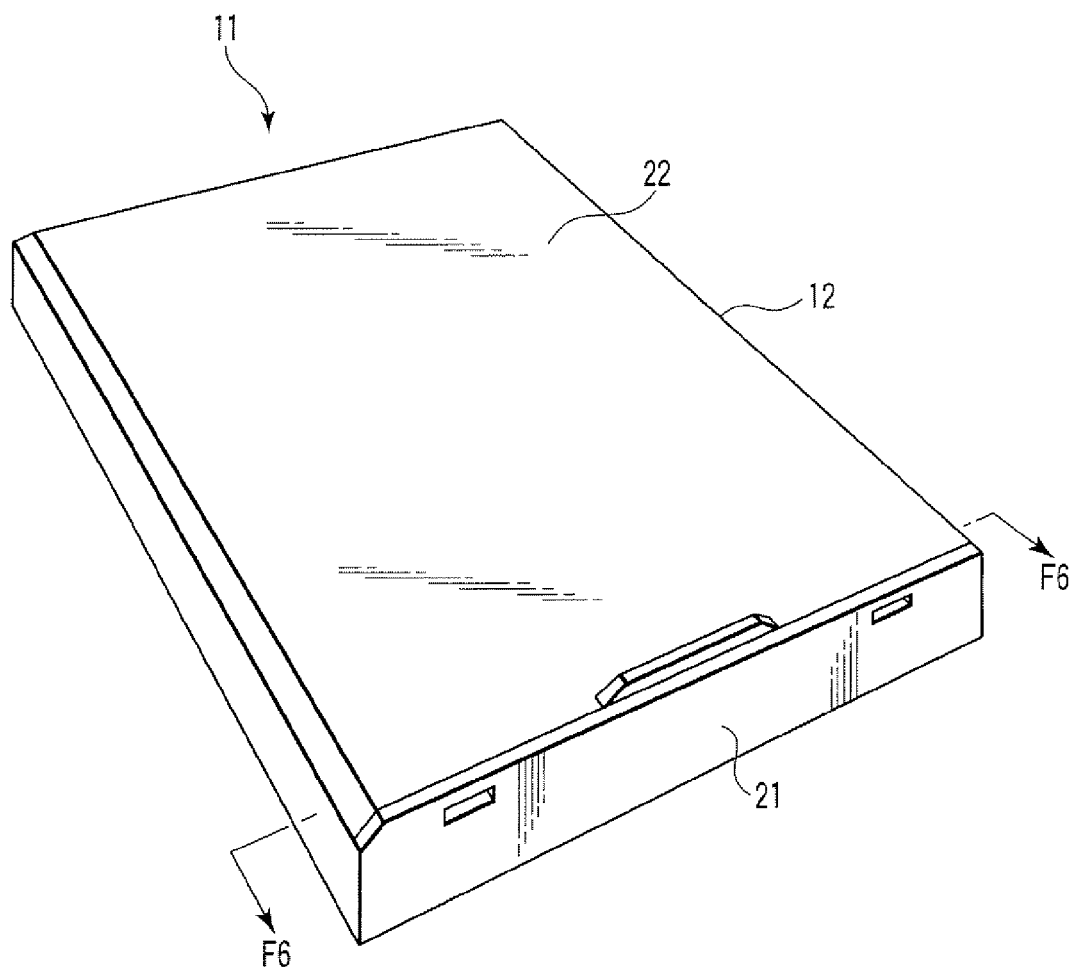
FIG. 1 is an exemplary perspective view illustrating a hard disk drive according to a first embodiment, which is mounted laterally.
Figure 2:
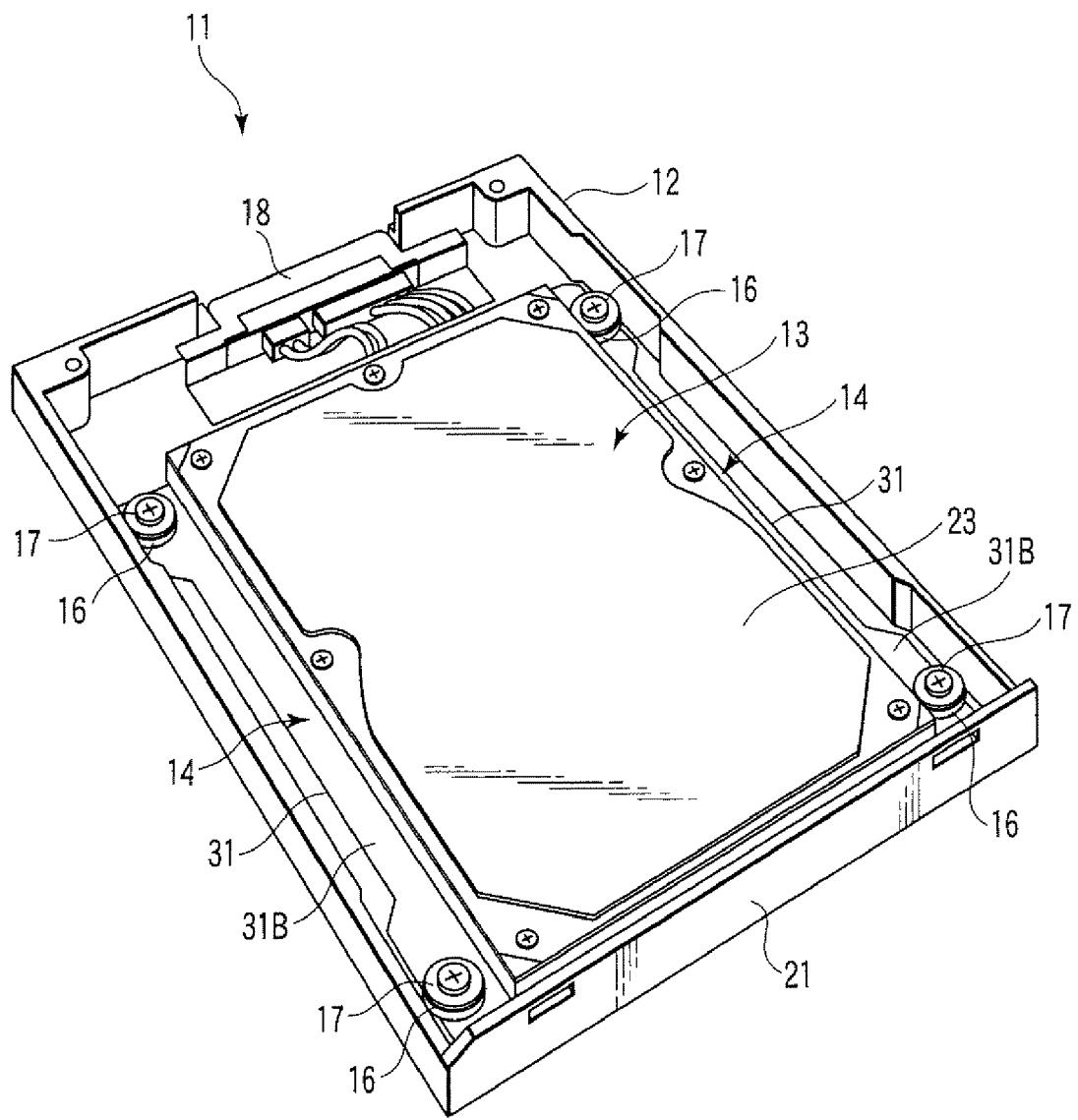
FIG. 2 is an exemplary perspective view illustrating the hard disk drive of FIG. 1 with a lid-shaped second portion removed therefrom.

As shown in FIGS. 1 to 3, the hard disk drive 11 comprises a housing 12, a main unit 13 contained in the housing 12, frames 14 supporting the main unit 13 away from the housing 12, projections 15 to which the frames 14 are attached, bushes 16 interposed between the frames 14 and projections 15, stepped screws 17 as fixing mechanisms for fixing the frames 14 to the projections 15, and a connector 18 for connecting the hard disk drive to an external device, such as a display unit.

The housing 12 is box-shaped and made of a resin, and includes a frame-shaped first portion 21 with a bottom 21A (see FIG. 6), and a lid-shaped second portion 22.

The main unit 13 comprises a case 23, and a plurality of magnetic disks and heads for reading/writing data to the magnetic disks, a motor 24 for rotating the magnetic disks, and a circuit board 25 for controlling the motor 24 and heads, which are contained in the case 23. As shown in FIG. 6, the main unit 13 stands on end in the housing 12, attached to the projections 15 via the frames 14.

As shown in FIG. 6, the projections 15 are made of a resin, and formed cylindrical and integral with the first portion 21 of the housing 12. The projections 15 project in the housing 12 and include screw holes 15A for permitting the stepped screws 17 to be screwed therein. The stepped screws 17 each have a head portion 17A having substantially the same diameter as the bushes 16, a shaft 17B extending from the head portion 17A, and a screw portion 17C extending from the shaft 17B.

The bushes 16 are so-called elastic rubber bushes, and are in the shape of cylinders having a preset thickness. The bushes 16 each have a groove portion 16A to be engaged with a corresponding holding portion 32, described later, of the frames 14, and have a pair of thick portions 16B thicker than the groove portion 16A at opposite sides of the groove portion 16A. Each thick portion 16B has an outer periphery 26, against which a corresponding contact portion 33 of the frames 14 radially abuts as indicated by arrow R in FIG. 6. Thus, the lower ones of the bushes 16 receive the entire weight of the drive main unit 13.

Figure 4:
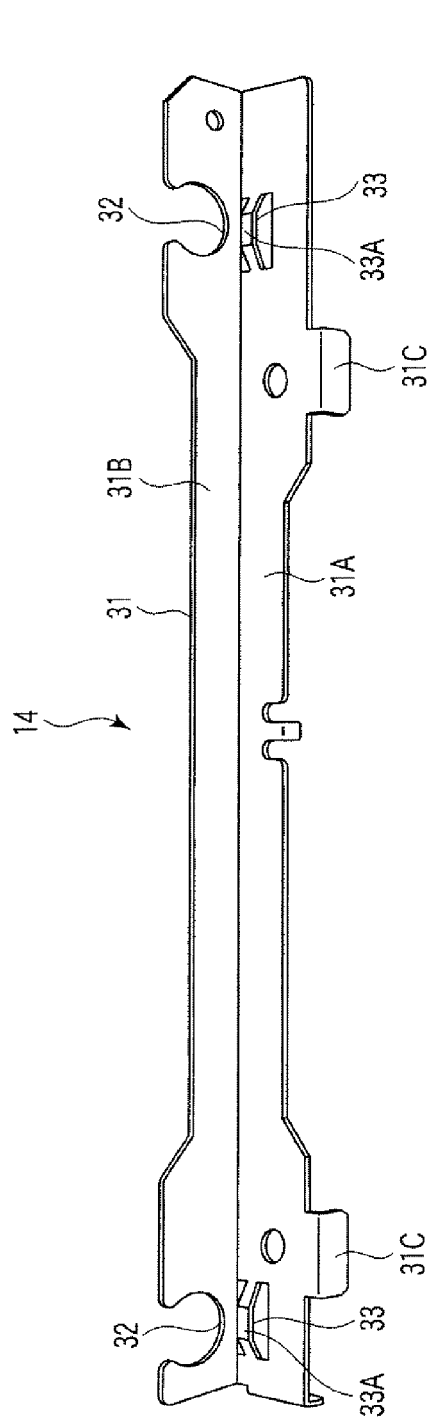
FIG. 4 is an exemplary enlarged perspective view illustrating the frame appearing in FIG. 3.
Figure 5:
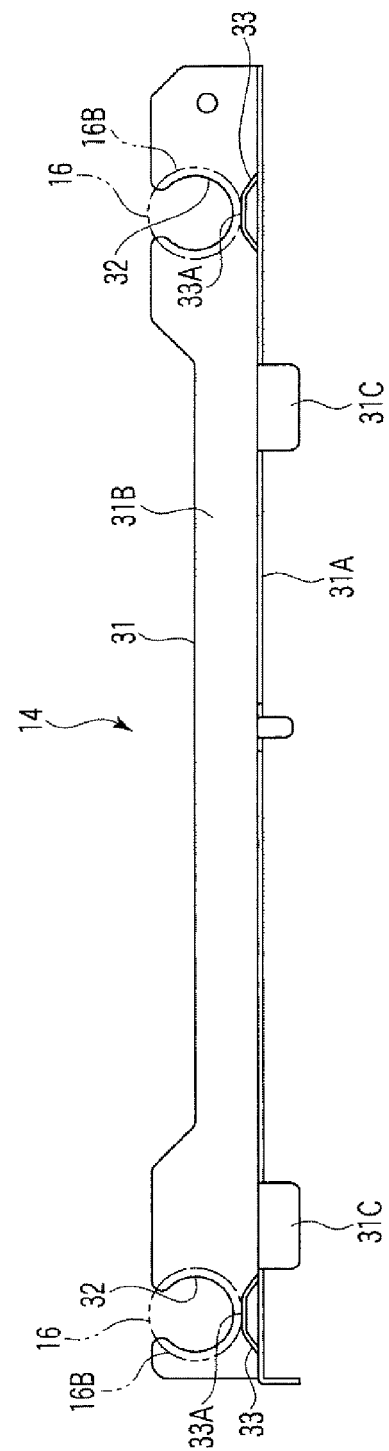
FIG. 5 is an exemplary front view of the frame shown in FIG. 4.

As shown in FIG. 3, the frames 14 are lengthways symmetrically located and are to be fixed to the opposing sides of the drive main unit 13. As shown in FIGS. 4 and 5, each frame 14 is formed by pressing a metal plate to an L-shaped cross section, and has a main body 31 of an L-shaped cross section, holding portions 32 incorporated in the main body 31 and used to hold the corresponding bushes 16, and contact portions 33 radially pressed against the outer peripheries 26 of the corresponding bushes 16.

As shown in FIG. 4, the frame main body 31 has a portion 31A to be fixed to a side surface of the drive main unit 13, an extension 31B extending perpendicularly from the fixed portion 31A, and claws 31C for supporting the drive main unit 13. The holding portions 32 are formed as circular cutout portions obtained by circularly cutting part of the extension 31B. The bushes 16 are fitted in the holding portions 32.

The contact portions 33 are substantially trapezoidal portions projecting from the fixed portion 31A, and have flat contact top surfaces 33A. The contact portions 33 are formed by pressing along with the frame main body 31, and are therefore formed integral with the latter. As shown in FIGS. 3 and 5, the contact portions 33 are brought into contact with the thick portions 16B of the bushes 16 when the bushes 16 are fitted in the holding portions 32.

As described above, in the embodiment, the holding portions 32 are circular cutout portions, and the contact portions 33 are projecting trapezoidal portions including the contact surfaces 33A. Accordingly, the contact areas of the contact portions 33 and bushes 16 are greater than those of the holding portions 32 and bushes 16.

As shown in FIG. 6, the lower bushes 16 receive the entire weight of the drive main unit 13. More specifically, this weight is imparted to the groove portions 16A of the bushes 16 via the holding portions 32, and to the thick portions 16B of the bushes 16 via the contact portions 33. In this state, when, for example, an external impact is imparted to the housing 12, it is absorbed by the bushes 16, thereby protecting the drive main unit 13 from the impact.

At this time, since the impact is mainly transmitted from the contact portions 33 of the frames 14 to the thick portions 16B of the bushes 16, there is no concentration of excessive load on the groove portions 16A of the bushes 16, thereby preventing the bushes 16 from being broken.

In the above-described embodiment, the hard disk drive 11 comprises the housing 12, the drive main unit 13 contained in the housing 12, the frames 14 supporting the drive main unit 13 to keep the main unit out of contact with the inner surfaces of the housing 12, the projections 15 inwardly projecting from the inner surfaces of the housing 12 and fixed to the frames 14, and the bushes 16 positioned between the frames 14 and projections 15 to radially receive the weight of the drive main unit 13 as indicated by arrow R in FIG. 6. The frames 14 each include the frame main body 31, the holding portions 32 incorporated in the frames 14 for holding the bushes 16, and the contact portions 33 independent of the holding portions 32 and to be radially brought into contact with the bushes 16.

In general, load is axially imparted to the bushes 16. However, depending upon the installing space in the housing 12 or in the case of standing the hard disk drive on end, the bushes 16 are mounted so that load is radially imparted thereto. In this case, by virtue of the frames 14 including the holding portions 32, and the contact portions 33 kept in radial contact with the bushes 16, concentration of load on the holding portions 32 is avoided. Accordingly, the bushes are prevented from being broken, i.e., the durability of the bushes 16 is enhanced. Further, by virtue of the contact portions 33, the anti-vibration performance of the bushes 16 is enhanced.

In this case, the contact area of the contact portions 33 and bushes 16 is greater than that of the holding portions 32 and bushes 16. This structure enables the contact portions 33 to receive the greater part of the weight of the drive main unit 13. As a result, concentration of the weight of the frames 14 on the groove portions 16A of the bushes 16 is avoided, thereby preventing the bushes 16 from being broken.

The contact portions 33 are formed integral with the frame main body 31 by pressing. Namely, the contact portions 33 can be formed easily. Further, it is not necessary to fix, to the frames 14, particular components serving as the contact portions 33, which means that the number of required components can be reduced. However, it is a matter of course that, for example, trapezoidal metal chips serving as the contact portions 33 may be adhered to the frame main body 31.

In this case, the bushes 16 have groove portions 16A to be engaged with the holding portions 32, and thick portions 16B thicker than the groove portions 16A, and the contact portions 33 are brought into contact with the thick portions 16B. Since in this structure, the contact portions 33 are brought into contact with the thick portions 16B that can efficiently absorb impacts, the anti-vibration performance of the bushes 16 is further enhanced.

Although in the embodiment, the holding portions 32 are provided on the frames 14, the invention is not limited to this. For instance, the outer diameter of the bushes 16 may be increased to bring the outer peripheries 26 of the bushes 16 into direct contact with the frame main bodies 31. However, unless the bushes 16 have an outer diameter substantially equal to or slightly larger than the diameter of the head portions 17A of the stepped screws 17 or that of the projections 15, they cannot exhibit sufficient anti-vibration performance. Accordingly, in the embodiment, the holding portions 32 are formed instead of changing the diameter of the bushes. Further, if the diameter of the bushes 16 is increased, a clearance for absorbing external impact imparted to the housing 12, if any, cannot be secured. Further, when the diameter of the bushes 16 is increased, a greater space is required for them. Also in these points, it is preferable to employ the holding portions 32 as in the embodiment.

Figure 8:
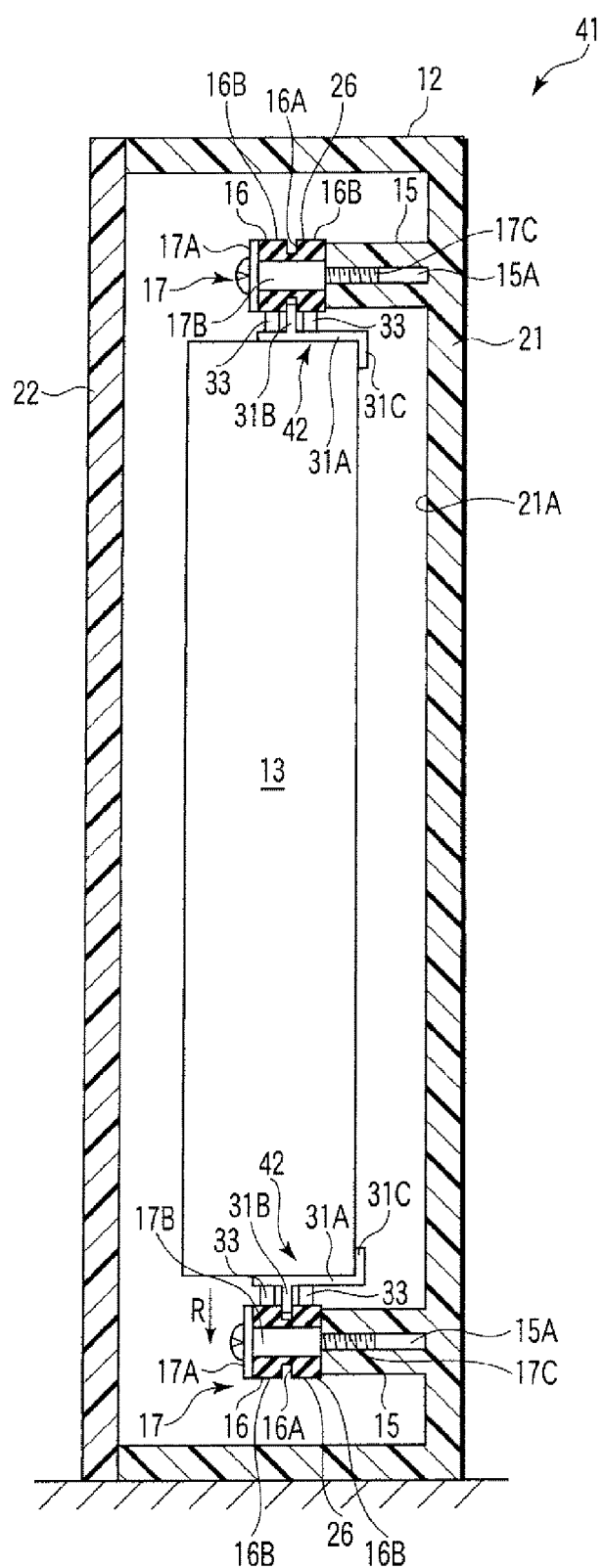
FIG. 8 is an exemplary sectional view of a hard disk drive according to a second embodiment, illustrating a state in which it stands on end.

Referring then to FIG. 8, a hard disk drive 41 according to a second embodiment will be described. The hard disk drive 41 of the second embodiment differs from the first embodiment only in the shape of frames 42. Therefore, a description will be given only of the frames 42.

In the second embodiment, the frames 42 of the hard disk drive 41 are symmetrical members, and secured to opposing sides of the drive main unit 13. As shown in FIG. 8, each frame 42 is made of a metal and formed by pressing into an L-shaped cross section. Each frame 42 comprises a frame main body 31 with an L-shaped cross section, holding portions 32 incorporated in the main body 31 and to be engaged with the bushes 16, and contact portions 33 provided independently of the holding portions 32 and to be brought into contact with the outer peripheries of the bushes 16.

The frame main body 31 includes a portion 31A to be fixed to a side surface of the drive main unit 13, an extension 31B extending perpendicularly from the fixed portion 31A, and claws 31C for supporting the drive main unit 13. The holding portions 32 are formed as circular cutout portions obtained by circularly cutting part of the extension 31B, as in the first embodiment.

The contact portions 33 have the same shape as the contact portions 33 of the first embodiment. However, unlike the first embodiment, a pair of contact portions 33 are provided at opposite sides of the extension 31B. Namely, the pair of contact portions 33 are incorporated in the fixed portion 31A and located at the positions corresponding to the respective thick portions 16B. The contact portions 33 are substantially trapezoidal portions projecting from the fixed portion 31A, and have flat contact top surfaces 33A. The contact portions 33 are formed by pressing along with the frame main body 31, and are therefore formed integral with the latter.

As shown in FIG. 8, the lower ones of the bushes 16 receive the weight of the drive main unit 13. More specifically, this weight is imparted to the groove portions 16A of the bushes 16 via the holding portions 32, and to the thick portions 16B of the bushes 16 via the contact portions 33. In this state, when, for example, an external impact is imparted to the housing 12, it is absorbed by the bushes 16, thereby protecting the drive main unit 13 from the impact.

At this time, since the impact is mainly transmitted from the contact portions 33 of the frames 42 to the thick portions 163 of the bushes 16, there is no concentration of excessive load on the groove portions 16A of the bushes 16, thereby preventing the bushes 16 from being broken.

In the above-described hard disk drive 41 of the second embodiment, a pair of contact portions 33 are provided at opposite sides of the corresponding holding portion 32. Therefore, an external impact imparted to the housing 12 is more efficiently absorbed than in the first embodiment. Further, since the impact is dispersed to the pair of contact portions 33 and the corresponding holding portion 32, concentration of load on the holding portions 32 is avoided. Accordingly, the bushes are prevented from being broken, i.e., the durability of the bushes 16 is enhanced. Further, since the holding portions 32 can be formed by pressing along with the other portions, even the provision of pairs of contact portions 33 does not make the manufacturing process significantly complex.

The hard disk drives 11 and 41 are not limited to those installed in a display unit, such as a television set, but also installable even in other electronic devices, such as personal computers. Further, the hard disk drives 11 and 41 can be modified in various ways without departing from the scope of the invention.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A hard disk drive comprising:
   a housing;
   a drive main unit contained in the housing;
   a frame which supports the drive main unit to keep the drive main unit away from the housing;
   a projection contained in the housing and inwardly projecting, the frame being mounted on the projection; and
   a bush provided between the frame and the projection and radially receiving a weight of the drive main unit,
   wherein the frame includes a frame main body, a holding portion incorporated in the frame main body and supporting the bush, and a contact portion provided independently of the holding portion and radially contacting the bush.

2. The hard disk drive according to claim 1, wherein a contact area of the contact portion and the bush is greater than a contact area of the holding portion and the bush.

3. The hard disk drive according to claim 2, wherein the contact portion is formed by pressing integral with the frame main body.

4. The hard disk drive according to claim 3, wherein the bush has a groove portion receiving the holding portion, and a thick portion thicker than the groove portion, and the contact portion is in contact with the thick portion.

5. A display unit comprising:
   a casing; and
   a hard disk drive contained in the casing,
   the hard disk drive including:
   a housing;
   a drive main unit contained in the housing;
   a frame which supports the drive main unit to keep the drive main unit away from the housing;
   a projection contained in the housing and
   inwardly projecting, the frame being mounted on the projection; and
   a bush provided between the frame and the
   projection and radially receiving a weight of the drive main unit,
   wherein the frame includes a frame main body,
   a holding portion incorporated in the frame main body and supporting the bush, and a contact portion provided independently of the holding portion and radially contacting the bush.

* * * * *